May 27, 1958 V. OZAROW 2,836,797

MULTI-ELECTRODE FIELD CONTROLLED GERMANIUM DEVICES

Filed March 23, 1953

Inventor:
Vernon Ozarow,
by Charles M. Hutchins
His Attorney.

United States Patent Office 2,836,797

Patented May 27, 1958

2,836,797

MULTI-ELECTRODE FIELD CONTROLLED GERMANIUM DEVICES

Vernon Ozarow, Syracuse, N. Y., assignor to General Electric Company, a corporation of New York Application March 23, 1953, Serial No. 344,079

13 Claims. (Cl. 332—52)

This invention relates to an improved multielectrode field controlled semiconductor device.

Semiconductor materials are generally of two conduction types, N-type and P-type, dependent upon the class of impurity in the semiconductor. Conduction in the N-type semiconductor is primarily by electrons free of, or very weakly linked to, lattice bonds. Conduction in the P-type semiconductor is primarily by the motion of electrons bonded in the atomic lattice to a point of electron deficiency in the lattice. As an electron leaves a point in the lattice to fill a deficiency at another point, it leaves a deficiency behind it. These deficiencies are commonly called "holes" and it is convenient to consider their motion through the atomic lattice to be the current carrier. Hence these holes may be considered as positive charges having approximately the same mass as an electron. The N- and P-type semiconductor materials, therefore, may be considered to have carriers of opposite types.

If separate bodies of semiconductors of the P-type and N-type are intimately joined together so as to form what is known as a P–N junction, application of a negative voltage to the P-type semiconductor and a positive voltage to the N-type semiconductor causes the holes to be shifted toward the negative voltage and the electrons to be shifted toward the positive voltage, so that fewer electrons or holes are in the vicinity of the junction between two types of semiconductor material. By this action a zone, which may be termed an exhaustion layer, is created that extends from one side of the junction to the other. Because there are very few, if any, carriers in this exhaustion layer, its resistivity is greatly increased. As the voltage across the junction is increased, the exhaustion layer expands so as to create a large zone of relatively high resistivity in a region formerly having a relatively low resistivity. If the voltage is decreased, the exhaustion layer contracts and the zone of relatively high resistivity is decreased. Variations in the voltage, therefore, vary the resistivity of the material in the vicinity of the junction. If the semiconductor in the vicinity of the junction is placed in series with a load resistor and if a fixed voltage differential is applied across the series combination, the voltage across the load resistor varies with the changes in the resistance of the semiconductor. These variations in voltage across the load resistor may be many times the variations in voltage applied across the junction of the P- and N-type semiconductor materials so that the device operates as an amplifier.

For reasons which will become apparent from the detailed description below, it is desirable that the exhaustion layer lie principally on one side of the junction. This can be effected if the side on which it is to be is made of semi-conductor material initially having a lower density of carriers than the semiconductor material on the other side of the junction. Furthermore, the operating characteristics are improved if the change in the density of the carriers from one side of the junction to the other is sharp rather than gradual.

In making a P–N junction by the method of growing crystals, the density and kind of carrier produced as the crystal is withdrawn from a melt depends on the density and kind of impurities in the melt. As it is difficult to change the impurity content of the melt rapidly, P–N junctions formed in this way do not generally exhibit the desired sharp change from a given density of one type of carrier to a considerably different density of the other type of carrier.

If, on the other hand, the P–N junction is formed by fusing some acceptor or donor material into a body of semiconductor material, a junction is formed in which the density of the carriers of different types changes sharply across the junction, as desired. Furthermore, the density of the carriers in the body beyond the junction is relatively low so that most of the exhaustion layer lies within the body of semiconductor material. Methods of forming P–N junctions by fusing and diffusing donor or acceptor impurities into a semiconductor body of predetermined conductivity and type and devices produced thereby are described more fully and claimed in copending Hall application Serial No. 187,478 filed September 29, 1950, assigned to the same assignee as the present invention, and a copending Dunlap, Jr., application Serial No. 187,490, filed September 29, 1950, now abandoned, and assigned to the same assignee as the present invention.

Therefore, it is an object of the present invention to provide an improved field controlled semiconductor device that may be made by the fusion technique and which exhibits a relatively sharp change in the density of the different type carriers on opposite sides of the junction, the relative densities of the carriers being such that an exhaustion layer established by the application of suitable potentials across the junction lies primarily on one side of the junction.

This objective can be obtained by fusing a band or ring of acceptor or donor material onto a body of semiconductor material having a suitably low carrier density. Changes in potential across the junction, therefore, produce changes in the resistance of the body in the vicinity of the junction and, therefore, the device can be used as an amplifier in the manner described above.

As is well known to those skilled in the art, semiconductor devices having a minimum exposed length of the junction between the N-type and P-type semiconducting materials maintain their characteristics over a longer period of time.

It is, therefore, another object of the present invention to provide a field-controlled semiconductor device wherein the amount of exposed junction between P-type and N-type semiconductor materials is minimized.

Previously-suggested field-controlled semiconductor devices have an output versus input characteristic that exhibits a certain non-linear relationship between the input and output. In accordance with this invention, improved field controlled semiconductor devices are provided that exhibit different non-linear relationships between the output and input signals.

The latter objectives may be attained by making the shape of the junction between the P- and N-type materials such that one of the materials subtends an area of a cross section of the other.

It is a further object of the invention to provide improved field-controlled semiconductor devices that may be used as mixers wherein one signal is multiplied by or heterodyned with another. Various other types of devices are also possible.

This objective can be obtained by fusing a plurality of bands of acceptor or donor material onto a body of semiconductor material, the bands being in such proximity that the exhaustion layers of each may interact in response to suitable voltages so as to limit the portion of the body on which the others may operate.

If the bands are located in such a way that the exhaustion layers do not interact in this manner, the device may be used as an adder.

These and other objects and advantages of the present invention will become more apparent after the following detailed consideration of the drawings in which.

Figure 1:
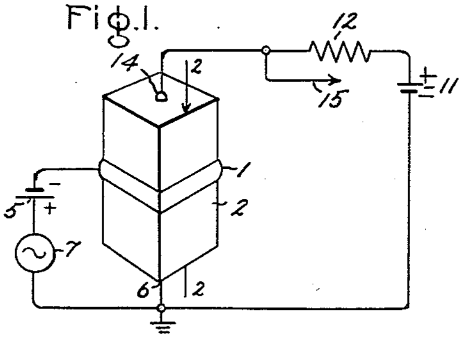
Figure 1 shows a field-controlled semiconductor device having a single input circuit and in accordance with the principles of the present invention.
Figure 2:
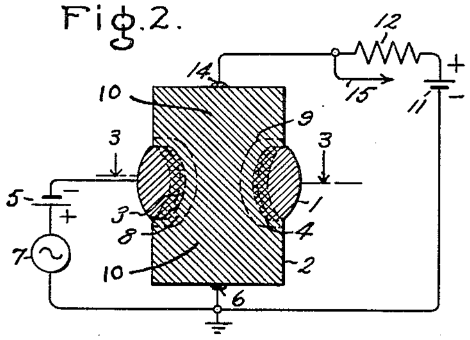
Figure 2 is a vertical section of the device of Figure 1 taken along the line 2—2.

Figure 1 shows an external view of a semiconductor device embodying the principles of this invention and Figure 2 is a vertical cross-section along the line 2—2 of Figure 1. Although other materials known to those skilled in the art may be used, one form of the semiconductor device may be constructed by fusing a band 1 of indium, an acceptor impurity, around a body 2 of N-type germanium. As set forth in the aforementioned Hall and Dunlap, Jr., applications, the fusion and diffusion of the indium into the germanium converts a layer of the germanium under the indium to a layer of P-type semiconductor material, which in this particular embodiment takes the form of an annular band 3. The surface 4 between the P-type semi-conductor material formed in this manner and the N-type germanium of the body 2 forms what is known in the art as a P–N junction.

A semiconductor device constructed in this manner may be operated as a field-controlled device by use of the following circuits. The P–N junction may be biased in the back direction by connecting the negative terminal of a source of fixed potential, here shown as a battery 5, to the indium band 1, and connecting the positive terminal to a base electrode 6 that is in ohmic contact (a contact formed without the creation of a rectifying junction) with the body 2 of germanium. A signal to be amplified may be superimposed on the bias potential by inserting a signal source 7 in series with the battery 5 as shown.

The body 2 can be made, as is well known to those skilled in the art, of N-type germanium of relatively high purity and therefore having relatively few carriers, in which case the density of the negative carriers in the body is much less than the density of the positive carriers in the P-type germanium of the annular band 3. Under these conditions, the application of the biasing potential provided by the battery 5 produces an exhaustion layer or zone 8 between the dotted lines that extends further into the body 2 than it does into the annular band 3. Because this exhaustion zone has very few, if any, carriers, its resistivity is extremely high. Current conduction through the portion of the body 2 encompassed by the annular band 3 of P-type semiconductor material is, therefore, substantially confined to a filament-like section 9 surrounded by the exhaustion layer 8. The resistance of this filament between its ends 10 is inversely proportional to its cross section. Hence when the exhaustion layer 8 expands as a greater back voltage is established across the P–N junction at the surface 4, the resistance of the filament 9 increases. As the exhaustion layer 8 shrinks with a decrease in the back voltage, the resistance of the filament 9 increases. In an extreme case, the back voltage can be made sufficiently large to cause the exhaustion layer to expand and reduce the cross sectional area of the filament section 9 to zero in which case its resistance is so large as to effectively cut off the flow of current. In the other extreme, when the battery 5 is disconnected so that the back voltage is zero, the effective cross sectional area of the filament expands to the surface 4 and has a low resistance substantially determined by the resistivity of the germanium of the body 2. In operation, the voltage of the battery 5 is such as to cause the exhaustion layer 8 to occupy an intermediate position as shown in Figure 2. The signals of the source 7 may increase or decrease the back voltage across the P–N junction and, therefore, produce a corresponding change in the resistance of the filament section 9.

In order to obtain an amplified output signal, a source of fixed potential, here shown as a battery 11, is connected in series with an impedance, here shown as a resistor 12, and this series combination is connected between the ohmic electrode 6 and another ohmic electrode 14 at the opposite end of the semiconductor body. An output lead 15 is connected to the electrode 14. Either of the ohmic electrodes 6 or 14 may be grounded, but in the example shown, the electrode 6 is grounded. The resistance of the body 2 being between the ends 10 of the filament section 9 and the electrodes 6 and 14 is not changed by variation in the back potential applied across the junction. Therefore, the semiconductor device of Figure 2 may be considered as a series circuit comprised of a fixed resistor 12 connected in series with the impedance between the electrodes 6 and 14 which in turn is comprised of the variable resistance of the filament section 9 and the fixed resistance of the remaining portion of the body 2. This series circuit is connected across a source of fixed potential supplied by the battery 11. The fractional amount of this fixed potential that appears at the output lead 15, therefore, depends on the relative magnitude of the impedance between the electrodes 6 and 14 and the resistance of the resistor 12. Variations in the back voltage produced by the signal source 7 vary the resistance of the filament 9 and, therefore, vary the fractional portion of the voltage supplied by the battery 11 that appears at the output lead 15. The voltage of the battery 11 can be made many times greater than the change in the back voltage across the P–N junction required to change the resistance of the filament section 9 from a minimum value to a maximum value, and the resistance of the resistor 12 can be made comparable to the maximum resistance of the filament section 9. Under these conditions a small change in the signal voltage supplied by the source 7 produces a large change in the voltage at the output lead 15.

In order to obtain maximum amplification, the resistance of the body 2 between the ends 10 of the filament section 9 and the electrodes 6 and 14 should be made as small as possible. This can be done by reducing the distance between the electrodes and the ends of the filament section and by maintaining the cross sectional area of these portions of the body 2 as large as practicable.

In the arrangement shown in Figure 2, a positive potential is applied to the resistor 12 but the device operates if the potential is negative, providing that the voltage of the body of N-type material 2 in the vicinity of the band 3 is positive with respect to the voltage applied to the band 3 by the battery 5. Under these conditions the semiconductor diode, comprised of the band 3 and the body 2, is biased in the back direction.

It will be understood by those skilled in the art that the device would operate in a similar manner if the band 3 is of N-type semiconductor material and the body 2 is of P-type material, providing suitable changes in the polarities and potentials are made.

Figure 7:
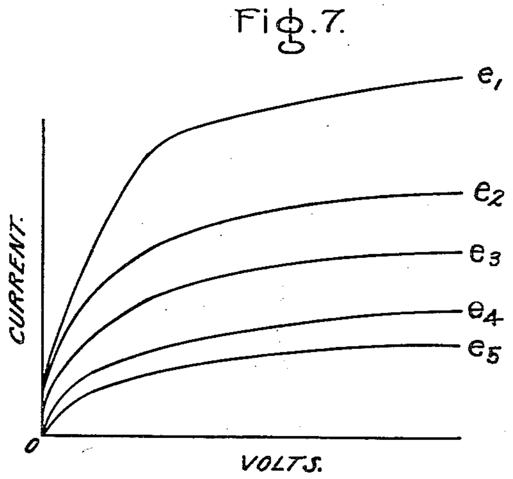
Figure 7 illustrates the characteristics of field-controlled semiconductor device of Figure 1.

Figure 7 is a graph of a series of curves indicating the current flowing through the load resistor 12 as a function of the voltage placed across the load resistor 12 and the body of semiconductor material 2 for different increasing values $e_1$, $e_2$, $e_3$, $e_4$, and $e_5$, of the back voltage. It will be seen that as the back voltage becomes greater, the current drawn through the body 2 becomes less for any given voltage applied across the body 2 and the load 12.

The following discussion explains why field controlled semiconductor devices are generally non-linear. In the first place, as the back voltage that forms the P–N junction is increased, an exhaustion layer forms which is substantially devoid of holes or electrons. The greater its depth, the greater is the resistance of the body 2 between the output lead 15 and ground. The width of the exhaustion layer varies as the square root of the back voltage so that the gain of the amplifier is non-linear. Hence even when the surface between the P- and N-type materials is essentially a plane, the device is non-linear.

Figure 3:
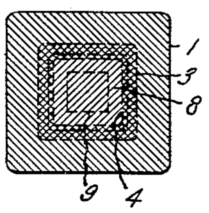
Figure 3 is a horizontal sectional view taken along the line 3—3 of Fig. 2.

However, in a device such as shown in Figure 2, where there is a band 3 of semiconductor material of one carrier type surrounding a semiconductor material of the opposite carrier type, the effect is to alter the degree of non-linearity. That this is so can best be realized by examining Figure 3, which shows a horizontal cross section of the body 2 of semiconductor material, taken at the line 3—3 of Fig. 2 and which lies vertically in the middle of the band of indium 1. The surface between the band 3 of P-type semiconductor material and the filament section 9 is again indicated by the numeral 4. The zone 8 between the dotted lines on either side of this surface is the exhaustion layer and, therefore, is substantially devoid of holes or electrons. The resistance of the semiconductor device between ground and the output lead 15 is approximately inversely proportional to the cross sectional area of material within the filament 9 that is not replaced by this exhaustion layer. As the exhaustion layer 8 expands, the cross sectional area of the filament 9 through which current flows decreases at a faster rate than if the surface 4 were a plane so that the variation of the resistance of the semiconductor device with a change in the applied back voltage exhibits a greater degree of non-linearity. This effect is greatest when the band of P-type material 3 surrounds the N-type material but is still present whenever the band subtends a portion of the cross sectional area of the N-type semiconductor material.

The degree of non-linearity obtained is, therefore, seen to be a function of the degree of the expansion of the exhaustion layer in response to changes in the back voltage across the junction as well as a function of the shape of the cross sectional area subtended by the band of semiconductor material. The shape of the subtended area can be changed by permitting the band to extend part way around the body 2 by changing the shape of the cross section of the body 2 or by a combination of these factors.

Figure 4:
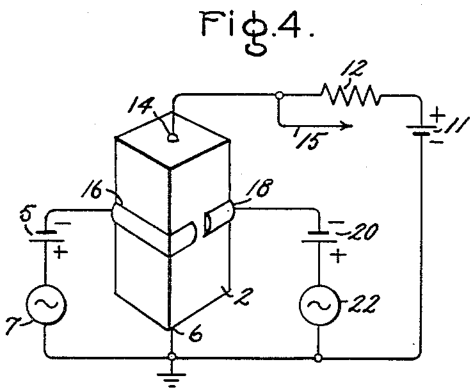
Figures 4 and 5 show field-controlled semiconducting devices embodying the principles of the present invention and having a plurality of input circuits.
Figure 5:
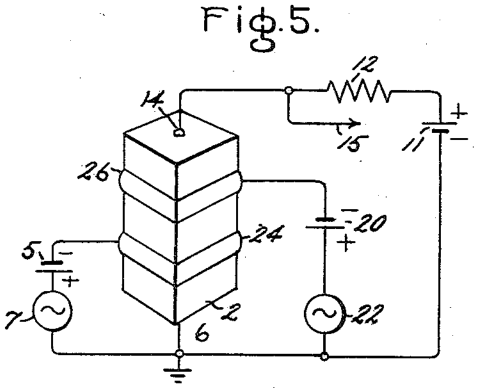

Figures 4 and 5 illustrate two of many possible arrangements, whereby a field-controlled semiconductor of the type described above may be used as a mixer or as a modulator. Those components that operate in a similar manner to components of Figures 1 and 2 are indicated by corresponding numerals. In Figure 4, for example, two semiannular bands 16 and 18 of P-type material are disposed on opposite sides of a body 2 of N-type material. These semi-annular bands are negatively biased by batteries 5 and 20 with respect to the portion of the body 2 in their vicinity. The signals to be mixed are superimposed on the back voltage biases provided by the batteries 7 and 20 by the series connected sources 7 and 22. Each of the bands 16 and 18 can produce an exhaustion layer and if the other band were not present, the resistance of the semiconductor device would change in a non-linear manner similar to that described in connection with Figure 1. However, if the back voltage applied to the band 16 is sufficiently great, the exhaustion layer created by it can extend over much or all of a cross section of the body 24 so as to reduce the cross sectional area of the N-type material of the body 2 that can conduct any substantial amount of current. Now if a suitable back voltage is established across the P–N junction formed by the other band 22, another exhaustion layer may be caused to extend into the body 2. This latter exhaustion layer can only increase the resistance of the portion of the body 2 not affected by the exhaustion layer provided by band 16. Hence the fractional amount by which the latter band can control the resistance of the device between the electrodes 6 and 14 is dependent on the back voltage applied to the band 16. This means that fractional changes in the overall resistance of the semiconductor device between ground and the output lead 15 that are brought about in response to the signal supplied by the source 22 to the band 18 is controlled by the magnitude of the signal supplied by the source 7 to the band 16 and vice versa so that the signals are effectively multiplied.

Figure 5 illustrates a semiconductor device that may be operated as a modulator. Components corresponding generally to those of Figure 4 are indicated by the same numerals. Two annular bands 24 and 26 of P-type semiconductor material are shown as surrounding the body 2 of N-type semiconductor material. Examination of Figure 2 shows that the exhaustion layer 8 produced by such annular bands can extend in a direction that is perpendicular to the plane of the band. Therefore, if the bands 24 and 26 are mounted sufficiently close together, the exhaustion layer produced by one band may occupy a region of the body 2 that may also be occupied by the exhaustion layer produced by the other band before it extends entirely across the body 2. The interaction of the exhaustion layers of the two bands operates to modulate the signal supplied by the source 7 with the signal provided by the source 22 for reasons similar to those set forth in the discussion of Figure 4.

If, on the other hand, the bands 24 and 26 are so far apart that there is no interaction between the exhaustion layers associated with them, the device adds non-linear functions of the signals applied to each band. The particular non-linear function of each signal depends, for reasons discussed in connection with Figure 1, on the shape of the cross section of the body 2 within the bands.

Figure 6:
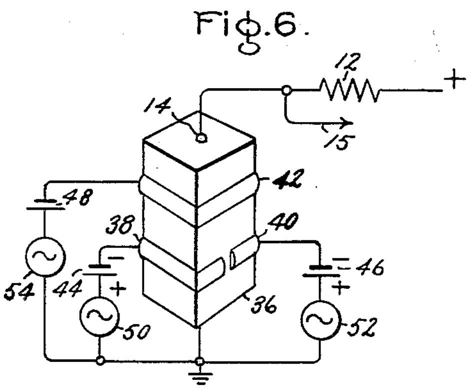
Figure 6 is another embodiment of the invention that can perform a plurality of functions.

That various other field controlled semiconductor devices, embodying the principles of the invention, may be constructed will be apparent to those skilled in the art. For example, the arrangement of Figure 6 may be such as to mix their signals, add some of the signals or mix two of them and employ the third as a gain control or even as a switch. A body 36 of semiconductor material of one type is provided with two semi-annular bands 38 and 40 as well as a complete annular ring 42, each of which is separately provided with biasing batteries 44, 46 and 48 and signal sources 50, 52 and 54 respectively. If the exhaustion layers of each of the bands 38 and 40 and the annular ring 42 interact, then all three signals applied to them can be mixed. If the exhaustion layers of each of the bands 38 and 40 and the annular ring 42 interact, then all three signals applied to them can be mixed. If they do not interact, functions of all three signals could be added. If the barriers of the bands 38 and 40 interact but do not affect the region of the body 36 in the vicinity of the annular ring 42, then the signals applied to the bands 38 and 40 may be mixed and added to a function of the signal applied to the band 42. Under this last set of assumed conditions, the signal applied to the ring 42 can be used to vary the overall gain of the device or to act as an off/on switch. Whether there is such interaction between the exhaustion layers depends on the proximity of the bands and the annular ring as well as the amplitudes of the voltages applied.

In Figure 2 the shape of the exhaustion layer of a band has been somewhat simplified for the purpose of explanation. Actually, the transverse electrostatic field produced in the body of semiconductor material 2 by the electrodes 6 and 14 may cause the exhaustion layer to extend toward one or the other of the electrodes as well as toward the center of the body 2. Thus when, as in Figures 5 and 6, two bands or partial bands are used, the exhaustion layer produced by one of them may extend even further into the region of the body of semiconductor material that may be affected by the exhaustion layer of the other. This increases the interaction between the exhaustion layers produced by the bands.

What I claim as new and desire to secure by Letters Patent of the United States is:

1. A semiconductor device comprising a body of semiconductor material of one carrier type, a band of semiconductor material of the opposite carrier type in intimate contact with said body, said band extending around at least a portion of the periphery of a cross section of said body so as to include a predetermined portion of the cross sectional area between the sides of said band, a first electrode electrically connected to said body at a point on one side of said band and a second electrode electrically connected to said body on the other side of said band.

2. A semiconductor device as defined in claim 1 wherein said band extends all the way around said body.

3. A semiconductor device as defined in claim 1 wherein there are provided additional bands each being in intimate contact with said body, and each including at least a portion of the cross sectional area of said body between respective sides thereof.

4. A semiconductor device comprising a body of semiconductor material of one carrier type, a band of semiconductor material of the opposite carrier type in intimate contact with said body, said band extending around at least a portion of the periphery of a cross section of said body so as to subtend a predetermined portion of the cross sectional area of said body, a first source of electrical potential having positive and negative terminals, electrical connections between one of said terminals and said band, electrical connections between the other terminal and said body so as to bias the junction formed by said band and body in the back direction, a second source of potential, an impedance having a predetermined resistive component, electrical connections between said second source of potential, said impedance and said body of semiconductor material of such nature as to form a series circuit.

5. A semiconductor device comprising, in combination, a body of semiconductor material of one carrier type, a first band of semiconductor material of a different carrier type, said first band extending at least part way around said body so as to subtend a portion of the cross sectional area of the body in the vicinity of the band and being in intimate contact therewith, a second band of semiconductor material of said different conductor type, said second band extending at least part way around said body so as to subtend a portion of the cross sectional area of the body in the vicinity of the band, means for establishing a bias voltage in the back direction between each of said bands and said body, a load impedance having a predetermined amount of resistance and a source of potential connected in series with said body, a first source of signals, means for superimposing said signals onto the bias voltage applied to said first band, a second source of signals, and means for superimposing said signals on the bias voltage applied to said second band.

6. A semiconductor device as defined in claim 5 wherein said first and second bands are in such proximity that there is interaction between the exhaustion layers formed by them in response to the signal voltages applied to them.

7. A semiconductor device as defined in claim 5 wherein said first and second bands are separated by such a distance that there is substantially no interaction between the exhaustion layers.

8. A semiconductor device as defined in claim 5 wherein said first and second bands extend part way around said body and wherein there is provided a third band extending entirely around said body, means for biasing said third band in back direction with respect to said body, a third source of signals, and electrical coupling circuit for superimposing the signals provided by said third source on the biasing voltage applied to said third band.

9. A semiconductor device comprising, in combination, a body of semiconductor material of one carrier type, a first band of semiconductor material of a different carrier type extending all around said body and in intimate contact therewith, a second band of semiconductor material of said different carrier type surrounding said body and in intimate contact therewith, said bands being substantially parallel to one another, a first electrode electrically connected to said body at a point on one side of said bands and a second electrode electrically connected to said body at a point on the other side of said bands.

10. A semiconductor device comprising, in combination, a body of semiconductor material of one carrier type, first, second and third bands of semiconductor material of different types, said bands all being in intimate contact with said body and substantially parallel to each other, said first band extending entirely around said body, said second and third bands each extending part way around said body, a first electrode electrically connected to said body at a point on one side of said bands and a second electrode electrically connected to said body at a point on the other side of said bands.

11. A semiconductor device comprising a body of semiconductor material of one carrier type, a band of semiconductor material of the opposite carrier type in intimate contact with said body, said band extending around at least a portion of the periphery of a cross section of said body so as to include a predetermined portion of the cross section between the sides of said band, the semiconductor material of said band having a greater carrier density than the semiconductor material of said body, a first electrode electrically connected to said body at a point on one side of said band and a second electrode electrically connected to said body on the other side of said band.

12. A semiconductor device comprising, in combination, a body of semiconductor material of one carrier type, a first band of semiconductor material of a different carrier type extending all around said body and in intimate contact therewith, a second band of semiconductor material of said different carrier type surrounding said body and in intimate contact therewith, said bands being so mounted that at least portions of the exhaustion layers produced as a result of a voltage applied between each of the bands and the body occupy carrier zones of the body, a first electrode electrically connected to said body at a point on one side of said bands and a second electrode electrically connected to said body at a point on the other side of said bands.

13. A semiconductor device comprising a body of semiconductor material of one carrier type, a band of semiconductor material of the opposite carrier type in intimate contact with said body, said band being formed by fusing an impurity of the opposite carrier type into said body, said band extending around at least a portion of the periphery of the cross section of said body so as to include a predetermined portion of the cross-sectional area between the sides of said band, a first electrode electrically connected to said body at a point on one side of said band and a second electrode electrically connected to said body on the other side of said band.

References Cited in the file of this patent

UNITED STATES PATENTS

| | | |
|---|---|---|
| 2,648,805 | Spenke et al. | Aug. 11, 1953 |
| 2,666,814 | Shockley | Jan. 19, 1954 |